3 Sheets. Sheet 1.
C. Wheeler. Jr.
Mower.
No. 1969 Reissued. May. 23. 1865.
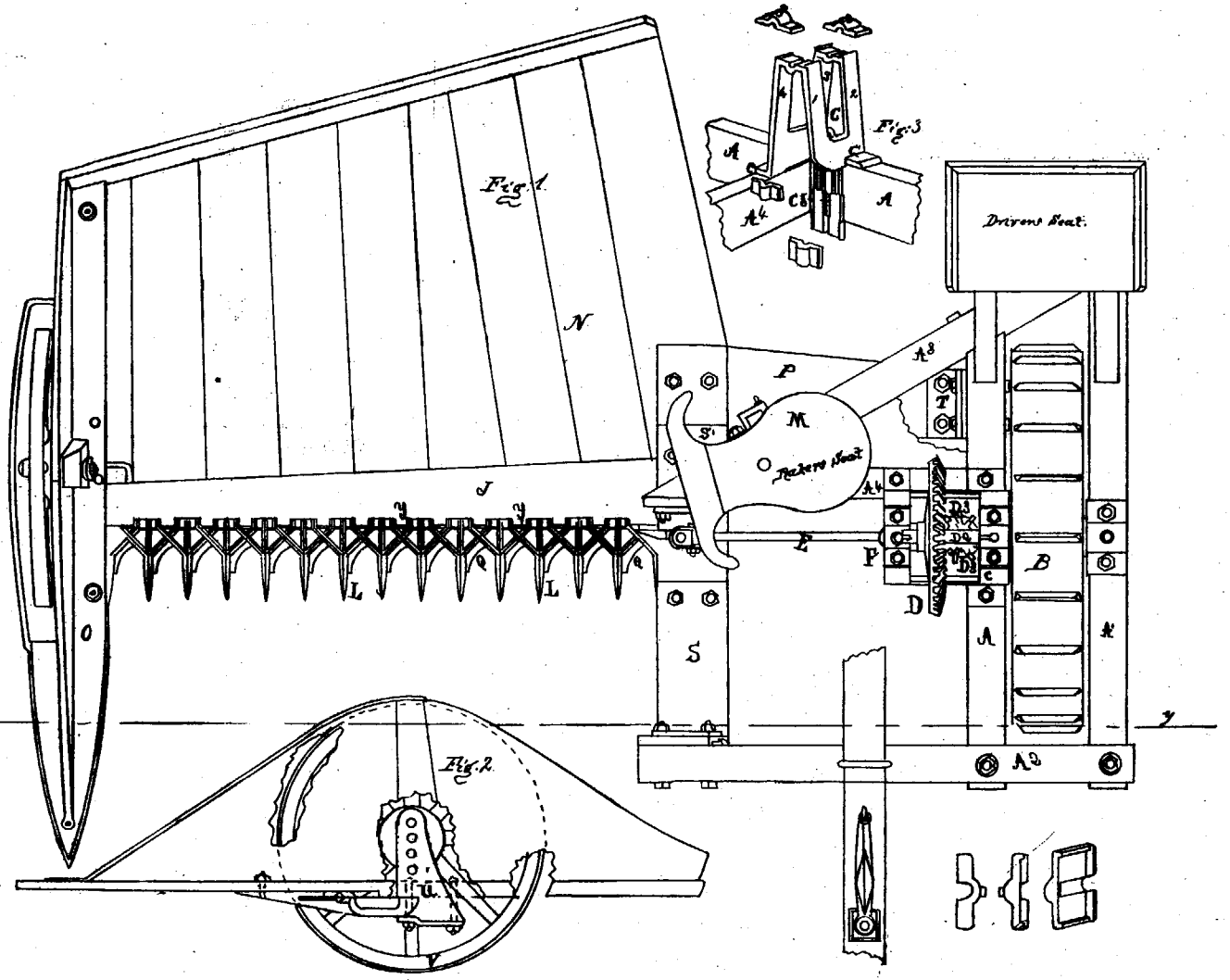
Witnesses James H. Quigley
Allen T. Houghton
C. Wheeler Jr. By
E. B. Forbush Atty 3 Sheets. Sheet 2.
C. Wheeler, Jr.
Mower.
No. 1969 Reissued May. 23. 1865.
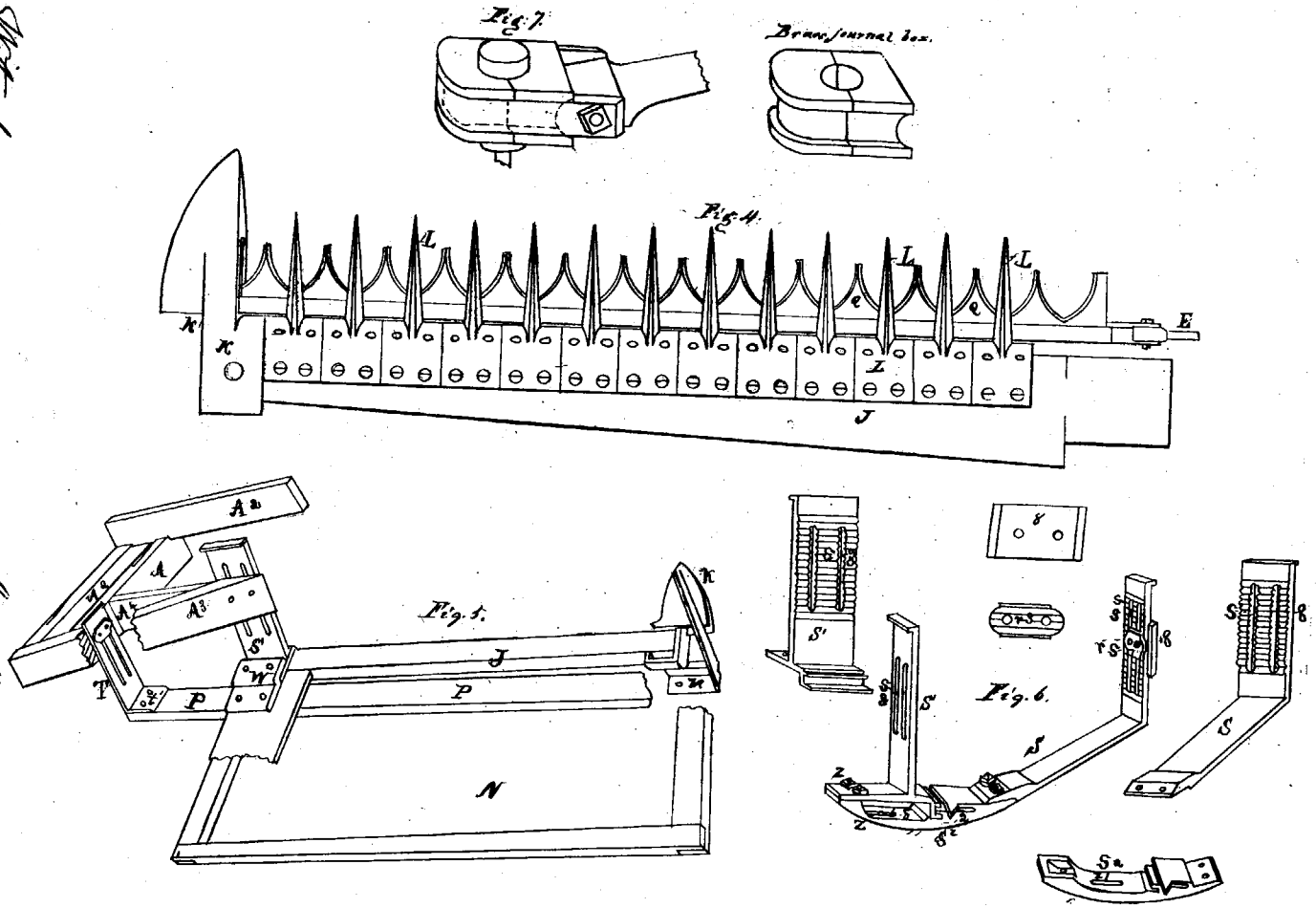
Witnesses
James H. Spiale
Allen T. Simpson
C. Wheeler Jr.
By E. B. Forbush
Atty 3 Sheets. Sheet 3.
C. Wheeler Jr.
Mower.
No. 1969.
Reissued May. 23. 1865.
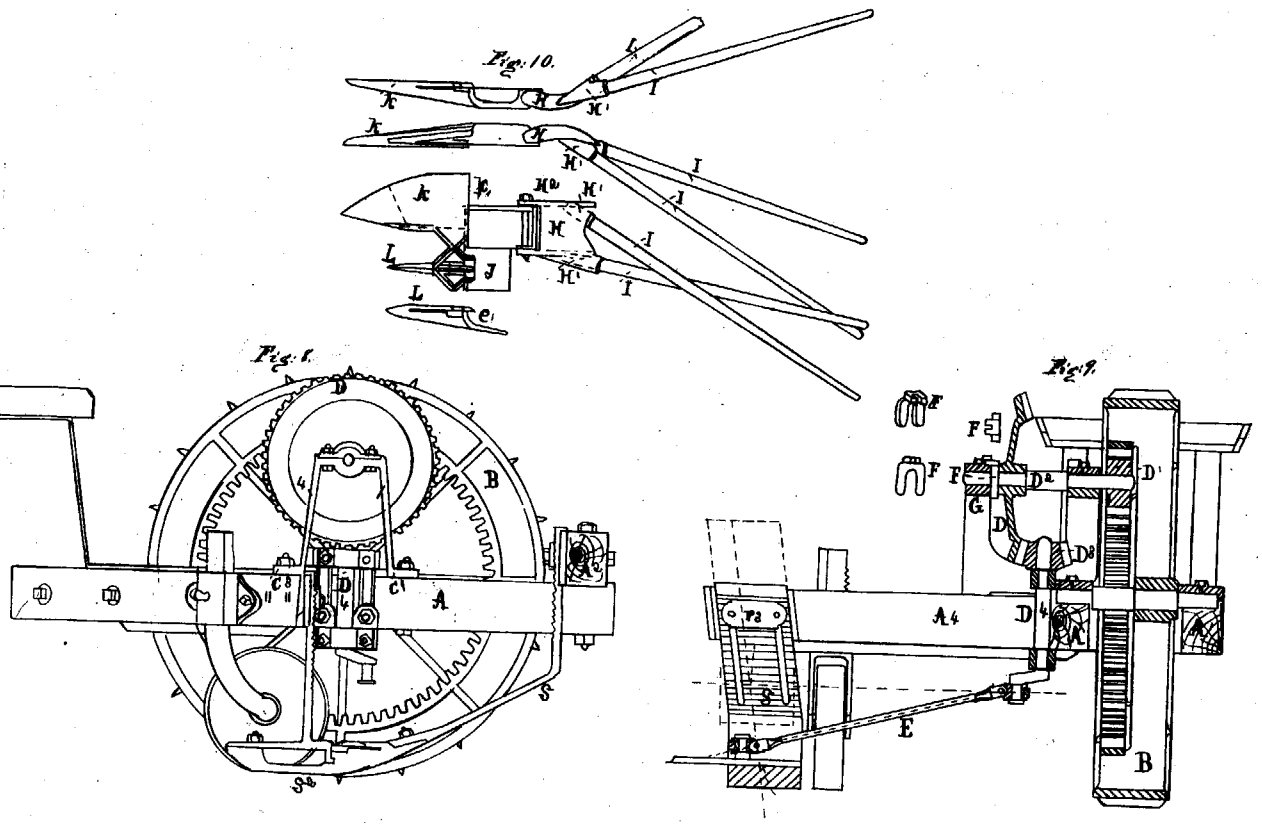
Witnesses
James H. Gridley
Allen F. Jamgstin
C. Wheeler Jr.
By E. P. Forbush
Atty

UNITED STATES PATENT OFFICE.

CYRENUS WHEELER, JR., OF POPLAR RIDGE, NEW YORK, ASSIGNEE, BY MESNE ASSIGNMENTS, OF E. B. FORBUSH.

IMPROVEMENT IN HARVESTERS.

Specification forming part of Letters Patent No. 12,721, dated April 17, 1855; Reissue No. 707, dated April 26, 1859; Reissue No. 1,969, dated May 23, 1865.

DIVISION C.

*To all whom it may concern:*

Be it known that ELIAKIM B. FORBUSH, of the city of Buffalo, in the county of Erie and State of New York, heretofore invented certain new and useful Improvements in Grain and Grass Harvesting-Machines, for which Letters Patent of the United States were duly issued to him on the 19th day of April, 1855, which said Letters Patent were afterward canceled and new Letters Patent issued to him on the 26th day of April, 1859, and such last-mentioned Letters Patent being now deemed to be invalid and inoperative by reason of a defective and insufficient specification; now, therefore, I, CYRENUS WHEELER, Jr., of Poplar Ridge, in the county of Cayuga and State of New York, assignee, by mesne assignments, of the whole interest, right, and title of the said Letters Patent and of said invention and improvements, do hereby declare, pursuant to the statutes in such case made and provided, that the following is a full and exact description of distinct and integral parts of said invention and improvements, reference being had to the accompanying drawings, making a part of this specification, in which—

Figure 1 is a top or plan view of said grain-harvesting machine, showing the location and relative position of the raker's seat, representing that part of the said invention claimed in this division. Fig. 2 is an outer-end elevation of the grain-platform. Fig. 3 is a perspective view of a cast-iron frame for supporting the small gear-wheels in a compact working position.

The nature of this part of said invention consists in combining with a cutting apparatus placed in rear of a line drawn through the front of the driving-wheel, and a grain-platform having a side delivery, a seat for the raker, supported upon or by the main frame and located behind the line of the cutters at the side of the grain-platform, and so arranged that the raker may sit facing the falling grain and deliver the cut grain at the side of the platform and in rear of the main frame.

To enable others skilled in the art to make and use said invention, I will proceed to describe the construction, use, and advantages of the same.

The main frame of the machine is represented by the timbers A A′ $A^2$ $A^3$ $A^4$, the finger-bar at J, the cutters at Q, the connecting-rod at E, the grain-platform at N, the strengthening-timber thereof at P, the grain-divider at O, and the "clamp" or device for connecting the cutting apparatus and grain-platform to the main frame of the machine at R.

The driving-wheel is represented at B and the raker's seat at M.

It will be noticed that by this combination and arrangement of the several parts of the machine the finger-bar and cutting apparatus are placed in rear of the line *x y*, drawn through the front of the driving-wheel, and that the grain-platform has a side delivery, which will deposit the gavels of grain on the ground in the rear or behind the main frame of the machine. By this arrangement of the cutting apparatus and grain-platform the point of delivery and the point at which the grain is cut are much nearer each other than in a machine having its cutting apparatus placed in front of a line drawn through the front of the driving-wheel. As the cut grain must be delivered from the platform as fast as it accumulates in sufficient quantities to form a bundle or sheaf, it is not only important that the raker should ride on the machine, but that he should occupy such a position as will best enable him to discharge the duties of a raker, which duties, under the most favorable circumstances, are arduous. It often becomes necessary for the raker to aid with his rake in bringing the lodged and tangled grain upon the platform; and to do so his position must be such that he can reach with his rake into the grain to be cut to raise it up and bring it to the cutters; and he must also be in a position to reach the outside dividing-board to remove therefrom from time to time such grain as may lodge thereon, which would, by its combined accumulation, if not removed, clog the machine; and to perform these duties at the proper time the raker must be in a position to see the cutters and the grain as it is being cut. To enable the raker to perform these duties and to sweep the cut grain from the platform in gavels suitable for binding, and deliver it on the ground in rear of the main frame, the seat M is provided, and placed and supported by the main frame behind the line of the cutters and at the delivery side of the platform, and fronting obliquely toward the cutters, so that the raker sits facing the falling grain. Thus located, he can watch the operation of the cutting apparatus, reach into the grain in front of the cutters, can reach the dividing-board with his rake, and sweep the grain from the platform and deliver it upon the ground in rear of the main frame far enough from the standing grain for the team and machine to pass in the succeeding swath without interfering with the gavels of grain as they lie upon the ground. In this position the raker can, with a good team, perform the double duty of raker and driver. The seat is supported upon suitable legs, which are fastened to the main-frame timbers $A^3$ and $A^4$.

The form of the seat and the particular manner of supporting it upon or in connection with the main frame are not deemed essential. It is the securing of this position by appropriate means which is considered the essential feature of this part of said invention.

Having now described that part of the said invention embraced in this division thereof, what I claim as the invention of the said FORBUSH, and desire to secure by these Letters Patent, is—

In combination with a cutting apparatus placed in rear of a line drawn through the front of the driving-wheel, and a grain-platform having a side delivery, a seat for the raker, supported upon or by the main frame and located behind the line of the cutters and at the side of the grain-platform, and so arranged that the raker may sit facing the falling grain and deliver the grain at the side of the platform in the rear of the main frame, substantially as set forth.

In testimony whereof I have hereunto subscribed my name in presence of two witnesses.

C. WHEELER, JR.

Witnesses:
W. H. MEAKER,
WM. ALLEN.